United States Patent [19]

Bihlmaier

[11] 4,010,773
[45] Mar. 8, 1977

[54] HYDROPNEUMATIC PRESSURE STORAGE DEVICE

[75] Inventor: Eugen Bihlmaier, Birkmannsweiler, Germany

[73] Assignee: Daimler-Benz Aktiengesellschaft, Germany

[22] Filed: May 21, 1974

[21] Appl. No.: 471,901

[30] Foreign Application Priority Data

May 22, 1973 Germany ............... 2325844

[52] U.S. Cl. .................................. 138/30
[51] Int. Cl.² ............................. F16L 55/04
[58] Field of Search ............ 138/30; 228/118, 216; 239/89, 96; 220/85 B

[56] References Cited

UNITED STATES PATENTS

| | | | |
|---|---|---|---|
| 1,679,702 | 8/1928 | Wysong | 228/216 X |
| 1,961,117 | 5/1934 | Wall | 228/216 X |
| 2,345,124 | 3/1944 | Huber | 138/30 |
| 2,916,001 | 12/1959 | Chyle et al. | 228/216 |
| 3,137,317 | 6/1964 | Peters | 138/30 |
| 3,195,576 | 7/1965 | Mercier | 138/30 |
| 3,365,566 | 1/1968 | Kuder | 228/216 X |
| 3,425,593 | 2/1969 | Kramer et al. | 138/30 X |
| 3,494,020 | 2/1970 | Cornell | 228/216 |
| 3,674,054 | 7/1972 | Mercier | 138/30 |

Primary Examiner—Richard E. Aegerter
Assistant Examiner—James E. Bryant, III
Attorney, Agent, or Firm—Craig & Antonelli

[57] ABSTRACT

A hydropneumatic pressure tank, whose housing consists of a bottom part and of a top part which are connected with each other by a welded seam; a retaining ring is arranged at the inner wall of the tank within the area of the welding seam, at which is secured the bellows serving as movable partition wall; at least the part of the retaining ring opposite the welding seam thereby consists of a layer rejecting the welding material.

29 Claims, 3 Drawing Figures

HYDROPNEUMATIC PRESSURE STORAGE DEVICE

The present invention relates to a hydropneumatic pressure tank or storage device whose housing consists of a bottom shell and of a top shell which are connected with each other by welding, and at the inner wall of which is arranged a retaining ring within the area of the welding seam, at which is secured a bellows serving as movable partition wall.

In one such pressure tank as disclosed in U.S. Pat. No. 3,195,576, the retainer ring is welded together with the bottom shell and the top shell. Starting from the welding seam, notches between the retaining ring and the bottom shell and/or between the retaining ring and the top shell will result therefrom, which impair the strength of the welded connection and may be the starting places for cracks. The present invention is concerned with the task to eliminate these shortcomings and to provide a welding seam fully satisfactory as regards strength for such a pressure tank or storage device. This is realized according to the present invention in that at least the portion of the retaining ring opposite the welding seam consists of a layer repelling or rejecting the welding material. This measure produces a smooth, highly resistant welding seam which is not in connection with the retaining ring and therefore also has no notches and edges within the areas in which the welding seam, retaining ring and bottom shell and/or top shell come together.

According to a further feature of the present invention, the portion of the layer disposed opposite the welding seam has an inwardly curved surface. As a result of this concave shape, the opposite portion of the welding seam receives a particularly favorable convex configuration which further improves the strength of the welded connection.

The layer rejecting or repelling the welding material may be constituted in an advantageous manner by materials of any conventional type which are applied to the outer side of the retaining ring or also by a ring arranged at the outside of the retaining ring.

According to a still further feature of the present invention, one edge of the retaining ring surrounds the edge of the bellows provided with a bulge and presses the same against the inner wall of the housing. In a similar manner, the other edge of the retaining ring according to the present invention surrounds a sealing ring and forces the same also against the inner wall of the housing. As a result of these measures, a leakage of pressure gas through the narrow gap between the welded seam and the opposite part of the retaining ring into the liquid space is prevented. Similarly, a gradual leakage or escape of pressure gas through a possibly gas-untight welding seam may be avoided. According to still another feature of the present invention, the inner wall of the housing includes grooves for the accommodation of the bulge of the bellows and/or of the sealing ring whereby the seal between the gas space and the liquid space is further improved within the area of the retaining ring.

Accordingly, it is an object of the present invention to provide a hydropneumatic pressure storage device which avoids by simple means the aforementioned shortcomings and drawbacks encountered in the prior art.

Another object of the present invention resides in a hydropneumatic pressure tank in which the danger of notches between the retaining ring and the tank which impair the strength of the welded connection are effectively avoided.

A further object of the present invention resides in a hydropneumatic pressure reservoir or tank which effectively prevents cracks and greatly improves the gas tightness thereof.

A still further object of the present invention resides in a hydropneumatic pressure storage device in which the welding seam fully satisfies all requirements as regards strength.

Another object of the present invention resides in a pressure tank of the type described above in which the welding seam is highly resistant without the danger of notch or crack formations.

These and other objects, features and advantages of the present invention will become more apparent from the following description when taken in connection with the accompanying drawing which shows, for purposes of illustration only, two embodiments in accordance with the present invention, and wherein.

Figure 1:
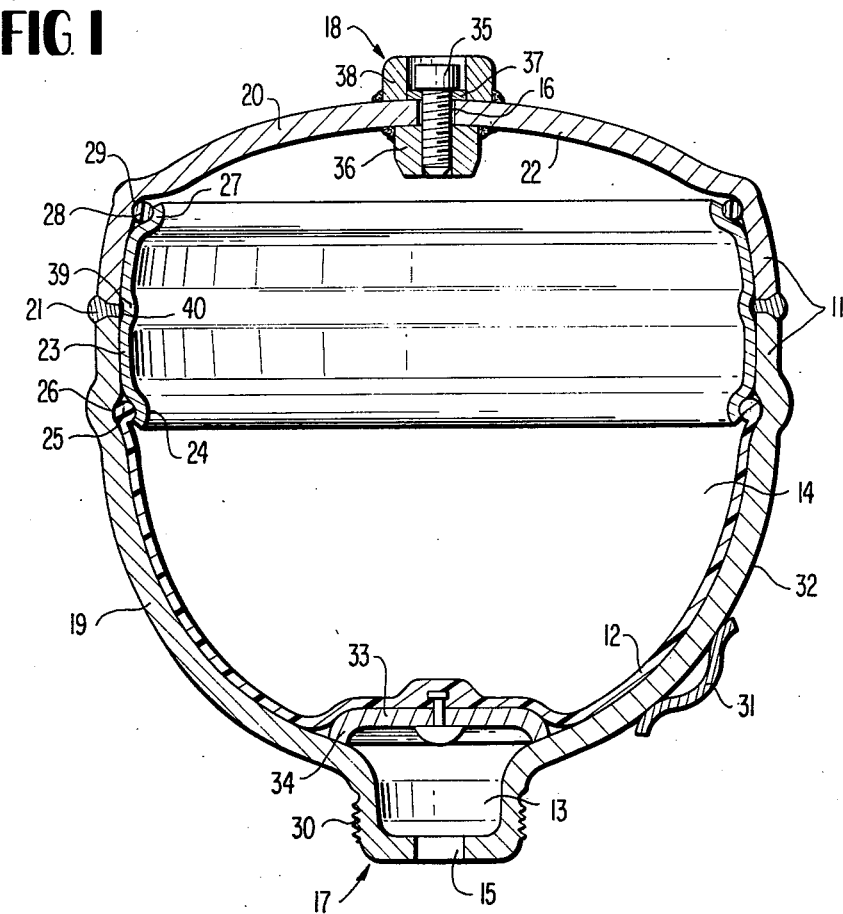
FIG. 1 is a cross-sectional view through a hydropneumatic pressure storage device in accordance with the present invention.
Figure 2:
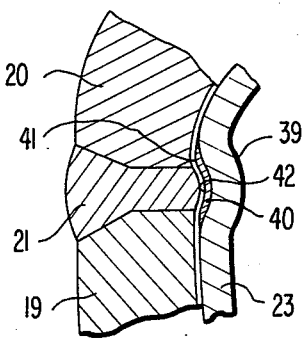
FIG. 2 is a partial cross-sectional view, on an enlarged scale, illustrating a detail of the pressure storage device of FIG. 1.

Referring now to the drawing wherein like reference numerals are used throughout the various views to designate like parts, and more particularly to FIGS. 1 and 2, the hydropneumatic pressure storage device or tank illustrated in these figures essentially consists of an axially symmetrical housing 11 which is subdivided by a flexible bellows 12 that serves as partition wall, into a liquid space 13 and into a gas space 14. The liquid space 13 and the gas space 14 include each an opening 15 and 16, respectively, disposed in the longitudinal axis of the housing 11. The opening 15 of the liquid space 13 is provided with a connecting part generally designated by reference numeral 17 while the opening 16 of the gas space 14 is provided with a closure part generally designated by reference numeral 18.

The housing 11 of the pressure tank consists of a bottom shell 19 and of a top shell 20 which are made of deep-drawn sheet metal plates and are connected with each other by a welding seam 21. A retaining ring 23 is arranged at the inner wall 22 of the housing 11 within the area of the welding seam 21, at which is secured the bellows 12. For that purpose, the lower edge 24 of the retaining ring 23, which is disposed in the lower shell 19, is so bent that it partially surrounds a bulge 25 delimiting the bellows 12 and presses the same into a ring-shaped groove 26 at the inner wall 22 of the lower shell 19. In a similar manner, the upper edge 27 of the retaining ring 23 which projects into the upper shell 20 surrounds the sealing ring 28 and forces the same into a ring-shaped groove 29 in the upper shell 20.

The connecting part 17 of the liquid space 13 is constructed as cup-shaped part of the bottom shell 19 and is provided with an external thread 30, by means of which the pressure tank is secured, for example, at a spring leg of a motor vehicle. A welded-on attachment 31 at the outer wall 32 of the housing 11 permits the emplacement of a work tool for facilitating the screwing-in of the pressure tank. In order to avoid that the bellows 12 is squeezed into the connecting part 17 by the pressure of the gas in the gas space 14, a sheet metal disk 33 with an outwardly bent edge 34 is riveted to the bottom side of the bellows 12. In the illustrated lower end position of the bellows 12, the edge 34 of the sheet metal disk 33 abuts at the inner wall of the housing 11 and thus bridges the connecting member 17.

The closure part 18 of the gas space 14 consists of a closure screw or bolt 35 which is screwed into a threaded nut 36 welded to the inner wall 22 of the housing 11 coaxially to the aperture 16. A sealing ring 37 surrounding the shank of the closure screw 35 prevents an escape of pressure gas. A ring 38 welded onto the outer wall 32 of the housing 11 coaxially to the opening 16 laterally delimits the sealing ring 37 and surrounds the head of the closure screw 35 which is thereby protected against damages.

As can be seen from FIG. 2, the retaining ring 23 includes along its circumference within the area of the welding seam 21 an indentation 39, onto which is applied a layer 40 of a material rejecting or repelling the welding material. The surface 41 of the layer 40 which is disposed opposite the welding seam 21 is also curved inwardly. This concave curvature of the surface 41 of the layer 40 is disposed opposite to a corresponding convexly curved surface 42 of the welding material 21 which is not welded together with the retaining ring 23 at any place. The welding seam 21 therefore is characterized by a smooth configuration free of edges and notches which assures a high strength of the welded connection.

During the assembly of the pressure tank or pressure storage device, at first the retaining ring 23 is so pressed into the bottom shell 19 that with its lower edge 24 it forces the bulge 25 of the bellows 12 into the groove 26. Thereupon, the upper shell 20 is placed over the retaining ring 23 projecting out of the bottom shell 19 whereby the upper edge 27 forces the sealing ring 28 into the groove 29. The top shell 20 is now so centered on the retaining ring 23 that a ring-shaped gap for the formation of the welding seam 21 remains within the area of the concave surface 41 of the layer 40 of the retaining ring 23. As a result of the layer 40 rejecting the welding material, the opposite surface 42 of the welding seam 21 assumes a favorable convex configuration. Since the layer 40 prevents that the retaining ring 23 is welded together with the bottom shell 19 and with the top shell 20, the layer 40 enhances the heat insulation effect of the retaining ring 23 and thereby protects the bellows 12 retained by the lower edge 20 of the retaining ring 23 against excessive heat interaction.

The layer 40 rejecting the welding material may be formed, for example, by spraying on a ceramic material of known type. However, it is also possible to galvanically apply such a layer, for example, of copper. Instead of being limited to the narrow strip disposed opposite the welding seam, a layer may also be applied over larger surfaces or over the entire surface of the retaining ring 23 for purposes of simplifying the manufacture.

Figure 3:
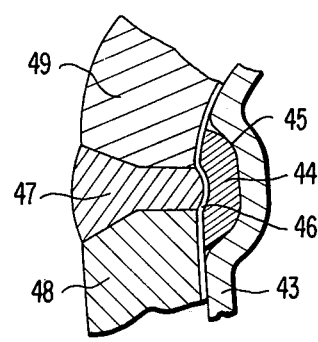
FIG. 3 is a partial cross-sectional view, similar to FIG. 2, and illustrating on an enlarged scale a modified embodiment of a pressure storage device in accordance with the present invention.

With the retaining ring 43 illustrated in FIG. 3 of a pressure tank or storage device, the layer rejecting the welding material is constituted by a two-partite ring 44 of ceramic material. The ring 44 may be glued or bonded into an annular groove 45 of the retaining ring 43 or may also be merely inserted into the same. An inwardly curved surface 46 of the ring 44 determines, as in the preceding embodiment, the configuration of the welding seam 47, fully satisfactory as regards strength, which connects the bottom shell 48 with the top shell 49 of the housing of the pressure tank. In addition thereto, the ceramic ring 44 assists the thermal insulating effect of the retaining ring 43 during the welding operation.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A hydropneumatic pressure storage device comprising a housing means having two parts welded together by a welding seam, a retaining ring means arranged at the inner wall of said housing means within the area of the welding seam, means for fixing said retaining ring means in said housing means, a bellows means serving as a movable partition wall, said retaining ring means holding said bellows means in said housing means, and a weld rejectable layer of a material for rejecting the welding material of said welding seam, said layer being disposed at least at a portion of said retaining ring means adjacent said welding seam, such that said retaining ring means is unbonded of said welding seam.

2. A hydropneumatic pressure storage device according to claim 1, characterized in that the housing means consists of a bottom shell and of a top shell welded together.

3. A hydropneumatic pressure storage device according to claim 1, characterized in that said layer consists of said portion of said retaining means adjacent said welding seam.

4. A hydropneumatic pressure storage device according to claim 3, characterized in that a portion of the layer disposed opposite the welding seam has a curved surface.

5. A hydropneumatic pressure storage device according to claim 4, characterized in that the layer is formed by said material being applied to said retaining ring means.

6. A hydropneumatic pressure storage device according to claim 4, characterized in that the layer is formed of a ring means arranged at said retaining ring means.

7. A hydropneumatic pressure storage device according to claim 1, characterized in that said retaining ring means holds said bellows means by a first edge of the retaining ring means which at least partially surrounds an edge of the bellows means provided with a bulge and forces the same against the inner walls of the housing means.

8. A hydropneumatic pressure storage device according to claim 1, characterized in that said portion of the layer disposed opposite the welding seam has a curved surface.

9. A hydropneumatic pressure storage device according to claim 1, characterized in that the layer is formed by said material being applied to said retaining ring means.

10. A hydropneumatic pressure storage device according to claim 1, characterized in that said material of said layer includes one of a ceramic material or a galvanized copper material.

11. A hydropneumatic pressure storage device according to claim 1, characterized in that said material of said layer is a ceramic material.

12. A hydropneumatic pressure storage device according to claim 11, characterized in that said layer of ceramic material is disposed on said retaining means.

13. A hydropneumatic pressure storage device according to claim 11, characterized in that said layer includes a ring of said ceramic material arranged between said retaining ring means and said welding seam.

14. A hydropneumatic pressure storage device according to claim 13, characterized in that said ring is a two-partite ring.

15. A hydropneumatic pressure storage device according to claim 1, characterized in that said layer includes a ring of said material for rejecting the welding material, said ring being arranged between said retaining ring means and said welding seam.

16. A hydropneumatic pressure storage device according to claim 15, characterized in that said ring is a two-partite ring.

17. A hydropneumatic pressure storage device according to claim 1, characterized in that said retaining ring means includes an indentation at said portion adjacent said welding seam, said layer being disposed at least partially within said indentation between said retaining ring means and said welding seam.

18. A hydropneumatic pressure storage device according to claim 17, characterized in that said material of said layer is a ceramic material.

19. A hydropneumatic pressure storage device according to claim 18, characterized in that said layer of ceramic material is disposed on said retaining means.

20. A hydropneumatic pressure storage device according to claim 18, characterized in that said layer includes a ring of said ceramic material arranged between said retaining ring means and said welding seam.

21. A hydropneumatic pressure storage device comprising a housing means having two parts welded together by a welding seam, a retaining ring means arranged at the inner wall thereof within the area of the welding seam, a bellows means serving as a movable partition wall which is fastened at the retaining ring means, and a weld rejectable layer of a material for rejecting the welding material of said welding seam, said layer being disposed at least at a portion of said retaining ring means adjacent said welding seam, such that said retaining ring means is unbonded of said welding seam,
wherein a first edge of the retaining ring means at least partially surrounds an edge of the bellows means provided with a bulge and forces the same against the inner walls of the housing means, and
wherein a second edge of the retaining ring means at least partially surrounds a sealing ring and forces the same against inner walls of the housing means.

22. A hydropneumatic pressure storage device according to claim 21, characterized in that said inner walls of the housing means are provided with groove means for accommodating respective ones of said bulge of the bellows means and said sealing ring.

23. A hydropneumatic pressure storage device according to claim 21, characterized in that an inner wall of the housing means is provided with grooves for accommodating said bulge of the bellows means and said sealing ring.

24. A hydropneumatic pressure storage device according to claim 21, characterized in that a portion of the layer disposed opposite the welding seam has an a curved surface.

25. A hydropneumatic pressure storage device according to claim 24, characterized in that the layer is formed by said material being applied to said retaining ring means.

26. A hydropneumatic pressure storage device according to claim 24, characterized in that the layer is formed of a ring means arranged at said retaining ring means.

27. A hydropneumatic pressure storage device according to claim 24, characterized in that inner walls of the housing means are provided with groove means for accommodating respective ones of said bulge of the bellows means and said sealing rings.

28. A hydropneumatic pressure storage device comprising a housing means having two parts welded together by a welding seam, a retaining ring means arranged at the inner wall thereof within the area of the welding seam, a bellows means serving as a movable partition wall which is fastened at the retaining ring means, and a weld rejectable layer of a material for rejecting the welding material of said welding seam, said layer being disposed at least at a portion of said retaining ring means adjacent said welding seam, such that said retaining ring means is unbonded of said welding seam,
wherein a first edge of the retaining ring means at least partially surrounds an edge of the bellows means provided with a bulge and forces the same against the inner walls of the housing means, and
wherein said inner wall of the housing means is provided with grooves for accommodating said bulge of the bellows means and a sealing ring.

29. A hydropneumatic pressure storage device comprising a housing means having two parts welded together by a welding seam, a retaining ring means arranged at the inner wall of said housing means within the area of the welding seam, means for fixing said retaining ring means in said housing means, a bellows means serving as a movable partition wall, said retaining ring means holding said bellows means in said housing means, and a weld rejectable layer of a material for rejecting the welding material of said welding seam, said layer being disposed at least at a portion of said retaining ring means adjacent said welding seam, such that said retaining ring means is unbonded of said welding seam, wherein said inner wall of the housing means is provided with grooves for accommodating a bulge of the bellows means and a sealing ring.

* * * * *